United States Patent
Liu et al.

(10) Patent No.: US 9,059,606 B2
(45) Date of Patent: Jun. 16, 2015

(54) SURFACE MOTOR DIRECT-DRIVE SUCKER-ROD SCREW PUMP DEVICE

(71) Applicants: Millennium Oilflow Systems & Technology Inc., Edmonton (CA); Jun Liu, Dongying Shandong (CN); Songbo Gou, Dongying Shandong (CN); Yongjian Tang, Dongying Shandong (CN); Hengli Cong, Dongying Shandong (CN)

(72) Inventors: Jun Liu, Dongying Shandong (CN); Songbo Gou, Dongying Shandong (CN); Yongjian Tang, Dongying Shandong (CN); Hengli Cong, Dongying Shandong (CN)

(73) Assignee: Millennium Oiflow Systems & Technology Inc., Edmonton Alberta (CA)

(*) Notice: Subject to any disclaimer, the term of this patent is extended or adjusted under 35 U.S.C. 154(b) by 0 days.

(21) Appl. No.: 14/200,388

(22) Filed: Mar. 7, 2014

(65) Prior Publication Data

US 2014/0197767 A1 Jul. 17, 2014

Related U.S. Application Data

(63) Continuation of application No. 12/375,951, filed as application No. PCT/CN2006/001967 on Aug. 4, 2006, now Pat. No. 8,702,400.

(51) Int. Cl.
*E21B 43/12* (2006.01)
*H02K 7/00* (2006.01)
(Continued)

(52) U.S. Cl.
CPC ........... *H02K 7/003* (2013.01); *Y10T 74/18664* (2015.01); *Y10T 74/18576* (2015.01); *E21B 43/126* (2013.01); *E21B 43/121* (2013.01);
(Continued)

(58) Field of Classification Search
CPC .............................. E21B 43/121; E21B 43/126
USPC ............. 417/415; 318/400.1, 400.37–400.39; 74/57, 59, 89.23, 89.28, 89.34; 168/68.5
See application file for complete search history.

(56) References Cited

U.S. PATENT DOCUMENTS 2,245,457 A 6/1941 Brassell
2,280,261 A * 4/1942 Pounds ............................. 74/57
(Continued)

FOREIGN PATENT DOCUMENTS

CA 2272269 A1 9/2000
CA 2270017 10/2000
(Continued)

OTHER PUBLICATIONS

Examiner's Report dated Jul. 24, 2012, CA2006347192.

*Primary Examiner* — Peter J Bertheaud
(74) *Attorney, Agent, or Firm* — Kilpatrick Townsend & Stockton LLP

(57) ABSTRACT

A surface motor direct-drive sucker-rod screw pump device is driven by a vertical three-phase permanent magnet brush-less DC motor, and comprises a motor controller (6), a rectifying circuit, an inversion circuit, a CPU and a driving circuit. The motor controller (6) is used to adjust the voltage and frequency of the motor by the rectifying circuit, the inversion circuit, the CPU and the driving circuit. Thus, the speed of the motor can vary from zero to the maximum. The device is easy to operate and has a higher efficiency.

16 Claims, 3 Drawing Sheets

(51) Int. Cl.
*F04C 14/08* (2006.01)
*H02P 6/00* (2006.01)
*H02P 6/14* (2006.01)
*H02P 25/02* (2006.01)
*H02K 29/00* (2006.01)
*H02P 6/16* (2006.01)
*F04B 47/02* (2006.01)
*F04C 15/00* (2006.01)
*F04C 2/107* (2006.01)

(52) U.S. Cl.
CPC ............... *F04C14/08* (2013.01); *H02P 6/002* (2013.01); *H02P 6/14* (2013.01); *H02P 25/026* (2013.01); *H02K 29/00* (2013.01); *H02P 6/16* (2013.01); *F04B 47/02* (2013.01); *F04C 2/1071* (2013.01); *F04C 15/008* (2013.01)

(56) References Cited

U.S. PATENT DOCUMENTS

| | | | |
|---|---|---|---|
| 2,891,408 A | 6/1959 | Burt | |
| 2,913,910 A | 11/1959 | Gillum | |
| 3,065,704 A * | 11/1962 | Hill | 417/13 |
| 4,603,283 A | 7/1986 | Oltendorf | |
| 5,404,767 A | 4/1995 | Sutherland | |
| 5,448,141 A * | 9/1995 | Kelley et al. | 318/400.35 |
| 5,694,010 A * | 12/1997 | Oomura et al. | 318/400.07 |
| 5,712,540 A | 1/1998 | Toda et al. | |
| 5,844,397 A | 12/1998 | Konecny et al. | |
| 5,945,802 A | 8/1999 | Konrad et al. | |
| 6,512,341 B2 | 1/2003 | Matsushiro et al. | |
| 7,102,306 B2 | 9/2006 | Hamaoka et al. | |
| 7,199,497 B2 | 4/2007 | Tessier et al. | |
| 7,330,011 B2 | 2/2008 | Ueda et al. | |
| 7,427,841 B2 * | 9/2008 | Hamaoka et al. | 318/400.01 |
| 2006/0275161 A1 * | 12/2006 | St. Denis | 417/415 |
| 2009/0108785 A1 | 4/2009 | Takada | |

FOREIGN PATENT DOCUMENTS

| | | |
|---|---|---|
| CA | 2509180 | 12/2005 |
| CN | 2125736 U | 12/1992 |
| CN | 2588658 Y | 11/2003 |
| CN | 2645327 Y | 9/2004 |
| CN | 2681438 Y | 2/2005 |
| CN | 1683791 A | 10/2005 |
| CN | 2737066 Y | 10/2005 |
| JP | 2005328583 A | 11/2005 |

* cited by examiner

SURFACE MOTOR DIRECT-DRIVE SUCKER-ROD SCREW PUMP DEVICE

CROSS-REFERENCES TO RELATED APPLICATIONS

This application is a continuation of U.S. patent application Ser. No. 12/375,951, filed Dec. 21, 2009, which is a U.S. national phase of International Application No. PCT/CN2006/001967, filed Aug. 4, 2006, which are incorporated herein by reference.

BACKGROUND OF THE INVENTION

The present oil extracting rod ground screw pump driving system employs common asynchronous motor through belt transmission to drive gear box, and the gear box then drives the polished rod of the screw pump to make rotary motion. The dynamic system for such a screw pump has the following disadvantages:

1. The transmitted power is limited. When the screw pump requires bigger torque (for example, a torque bigger than 1500 Nm) or the system transmitted power is bigger (for example, bigger than 10 kW), belt easily slips and be damaged, teeth of the gear box are easily broken and damage, therefore it's difficult to satisfy the requirement.

2. A large amount of mechanical maintenance and high operation cost are needed. Rotary sealing parts must be installed within the gear box because there is lubricating oil in the gear box. In practical operation, problem of lubricating oil leakage always happens in said gear box. Moreover, the reliability of belt transmission is poor, which leads to the large amount of mechanical maintenance and high operation cost during practical operation.

3. The efficiency is low. In general, for the convenience of starting, the equipped motor is always chosen to have 3 times the power as that of the practical operation power, which leads to the operation of asynchronous motor under low load rate, thus the efficiency is rather low and generally is about 75%.

4. The regulation of parameter is not convenient. When the speed need to be re-regulated in case that the downhole working condition varies, generally, the belt pulley need to be changed or variable pole adjustable speed motor need to be employed. The changing of belt pulley is very troublesome, while just one to two gears can be used through the speed adjusting of the variable pole adjustable speed motor, which make it really not convenient in practical usage.

5. The noise is great. The noise during the operation of mechanical speed reducing devices and high speed asynchronous motor is great and thus it is not suitable to installed in residential districts.

6. The occupied are for the equipment is large. Since the belt pulley system requires a large occupied area, said equipment is not suitable for the situation that required area is small, such as the situations of offshore oil-production platform or cluster well etc.

A low speed motor direct drive screw pump device has been provided in the disclosed invention patent application 200510042122.8, said device consists of polished rod, shaft coupling, low speed motor, motor controller, fixing seat, screw pump, in which the motor shaft of said low speed motor is set hollow and through the polished rod, it was fixed with polished rod as one through shaft coupling, the polished rod passes through the central hole of the fixed seat and connects to the shaft of screw pump downhole, low speed motor is fixed onto the fixed seat. The motor controller is installed within the terminal box of low speed motor, matching controller for the low speed motor is employed. Such a motor directly driving screw pump cancelled the usage of a belt transmission and a speed change gear device, motor shaft is connected to the pump shaft of screw pump through polished rod, the reactive power loss is decreased, the system efficiency and reliability of screw pump is increased, the oil extracting cost is reduced, at the same time, the volume and weight of the screw pump is reduced.

However, said device does not realize the selectively precise regulation of any value of motor speed from zero to maximum by controller, and said device has the disadvantage of inconvenience of speed regulation, moreover, the efficiency of the system needs further increase.

BRIEF SUMMARY OF THE INVENTION

The purpose of the invention is to provide an efficient rod ground screw pump direct drive screw pump, in which the motor speed of direct drive screw pump can be precisely chosen between zero to maximum and the operation is convenient.

The motor direct drive rod ground screw pump device according to the invention, comprises a polished rod 1, polished rod clip 2, motor 4, motor controller 7, flange oil outlet 6, oil well flange 8, screw pump body 9, in which: said motor is a vertical three phase permanent magnet brushless direct current motor with a hollow shaft, the polished rod passes through said hollow shaft; said motor controller comprises a rectification circuit for rectifying the alternating current into direct current; converter circuit for transforming the direct current into adjustable alternating current; CPU for modulating the motor sensorless DSP direct current brushless sine wave; driving circuit for isolating the signal and magnifying the power, as well as acting on converter circuit and adjusting the voltage of permanent magnet motor thus realizing poleless speed adjusting.

The motor direct drive rod ground screw pump device according to the invention, by employing vertical three phase permanent magnet brushless direct current motor and the motor controller matching it, successfully realizes the precise choosing of the motor speed of direct drive screw pump between zero and maximum, moreover, said device is easily controlled and the efficiency of the system is high.

The motor direct drive rod ground screw pump device according to the invention, said motor controller comprises a rectification circuit for rectifying the alternating current into direct current; converter circuit for transforming the direct current into adjustable alternating current; Hall sensor for detecting the rotary position of the rotor of vertical three phase permanent magnet brushless direct current motor; CPU for modulating the direct current brushless sine wave of mono-chip microcomputer with Hall sensor; driving circuit for isolating the signal and magnifying the power, as well as acting on converter circuit and realizing smoothly speed adjusting of motor.

The motor direct drive rod ground screw pump device according to the invention, the bottom of said vertical three phase permanent magnet brushless direct current motor is installed with a thrust bearing with a dynamic load of larger than 10 tons.

The motor direct drive rod ground screw pump device according to the invention, said vertical three phase permanent magnet brushless direct current motor employs F level insulation, the security level of the shell is IP54 and the temperature rises on B-class assessment.

The motor direct drive rod ground screw pump device according to the invention, characterized in that the motor torque of said vertical three phase permanent magnet brushless direct current motor system is 200-6000 Nm, rotary speed is 0-1000 rpm/min.

The motor direct drive rod ground screw pump device according to the invention, said rectification circuit is a three phase semi-control bridge.

The motor direct drive rod ground screw pump device according to the invention, said converter circuit is a three phase full-bridge converting output employing insulate gate bipolar transistor IGBT.

The motor direct drive rod ground screw pump device according to the invention, said rectification circuit is a three phase semi-control bridge; said converter circuit is a three phase full-bridge converting output employing insulate gate bipolar transistor IGBT, CPU has inputs of controller direct current bus voltage, motor current and temperature signal of module radiator.

The motor direct drive rod ground screw pump device according to the invention, the range of the input for said current controller bus voltage is 3.times.380V-3.times.690V, f=50/60 Hz.

The motor direct drive rod ground screw pump device according to the invention, the current sampling signal between converter circuit and motor is transferred into CPU.

The motor direct drive rod ground screw pump device according to the invention, CPU has a communication interface and a human-machine operation panel.

The motor direct drive rod ground screw pump device according to the invention, CPU has a start-stop signal input port.

Advantageous Effect

The motor direct drive rod ground screw pump device according to the invention, the employed vertical three phase permanent magnet brushless direct current torque explosion proof motor has the following characteristics: 1) the structure is vertical and the shaft is hollow, thus it's convenient for the pump rod to pass through, the bottom of the motor has a thrust bearing with a dynamic load of larger than 10 tons, such that the motor can withstand the weight of the downhole whole screw pump body and polished rod which is less than 10 tons. The suitable diameter of the polished rod is within 40 mm. 2) the rotor of the motor is permanently magnetic and employs the control manner of brushless direct current. The rotor has no excitation loss and has a rated efficiency of 94%, the efficiency can also be higher than 88% when ⅓ load rate is employed; the reactive loss absorbed by the system is very small. However, the operating efficiency of the asynchronous motor employed by traditional mechanical screw pump under ⅓ load rate is about 75%. Compared with asynchronous motor, the efficiency of the direct drive permanent magnet direct current brushless motor has been increased by about 10% (including the loss of transducer of 3%). 3) Explosion proof property. Direct drive motor is installed at the upper of oil well and said motor requires explosion proof design according to the requirement of safety regulation. Said device can be safely operated in division 2 explosion hazardous places and employs F level insulation, the security level of the shell is IP54 and the temperature rises on B-class assessment. The requirement for operating reliability and temperature of motor can be satisfied by choosing high quality raw material and leaving a large margin for electrical and mechanical computations.

The precisely speed adjustable high-efficiency motor direct drive rod ground screw pump device according to the invention, the control manner of the controller which matches with the motor is brushless direct current (BLDC) sine wave, the speed of motor can be controlled by controller as any speed between zero and maximum to synchronously drive the rotary operation of polished rod, thus realizing the smooth precise speed adjusting of polished rod.

Advantageous Effect

The motor direct drive rod ground screw pump device according to the invention, the employed vertical three phase permanent magnet brushless direct current torque explosion proof motor has the following characteristics: 1) the structure is vertical and the shaft is hollow, thus it's convenient for the pump rod to pass through, the bottom of the motor has a thrust bearing with a dynamic load of larger than 10 tons, such that the motor can withstand the weight of the downhole whole screw pump body and polished rod which is less than 10 tons. The suitable diameter of the polished rod is within 40 mm. 2) the rotor of the motor is permanently magnetic and employs the control manner of brushless direct current. The rotor has no excitation loss and has a rated efficiency of 94%, the efficiency can also be higher than 88% when ⅓ load rate is employed; the reactive loss absorbed by the system is very small. However, the operating efficiency of the asynchronous motor employed by traditional mechanical screw pump under ⅓ load rate is about 75%. Compared with asynchronous motor, the efficiency of the direct drive permanent magnet direct current brushless motor has been increased by about 10% (including the loss of transducer of 3%). 3) Explosion proof property. Direct drive motor is installed at the upper of oil well and said motor requires explosion proof design according to the requirement of safety regulation. Said device can be safely operated in division 2 explosion hazardous places and employs F level insulation, the security level of the shell is IP54 and the temperature rises on B-class assessment. The requirement for operating reliability and temperature of motor can be satisfied by choosing high quality raw material and leaving a large margin for electrical and mechanical computations.

The present invention realizes the smooth speed adjusting through the special controller matched with the three phase permanent magnet brushless direct current torque explosion proof motor. The rotary speed can be continuously adjusted within the range of 0-500 rpm/min under a rated power voltage. The controller employs digital manner and the range of the input of power supply is: 3.times.380V-3.times.690V, f=50/60 Hz. Commutation controlling parts has two manners: one is a simple manner with Hall sensor employing monochip microcomputer control, in particular as brushless direct current manner controlled by sine wave, the characteristics of said manner is the control motor has a low noise and satisfies the requirement of large power, as well as the property is much better than the manner of square wave. Another is a sensor-less manner which can be completed by high performance DSP chip, the advantage of said manner is a simple connection and a higher reliability.

The controller has inputs of bus voltage, motor current and temperature of module radiator to complete the property of motor control and protection. Said controller further has auxiliary heating, a start-stop I/O, communication interface and a human-machine operation panel. The operation is very simple.

Figure 1:
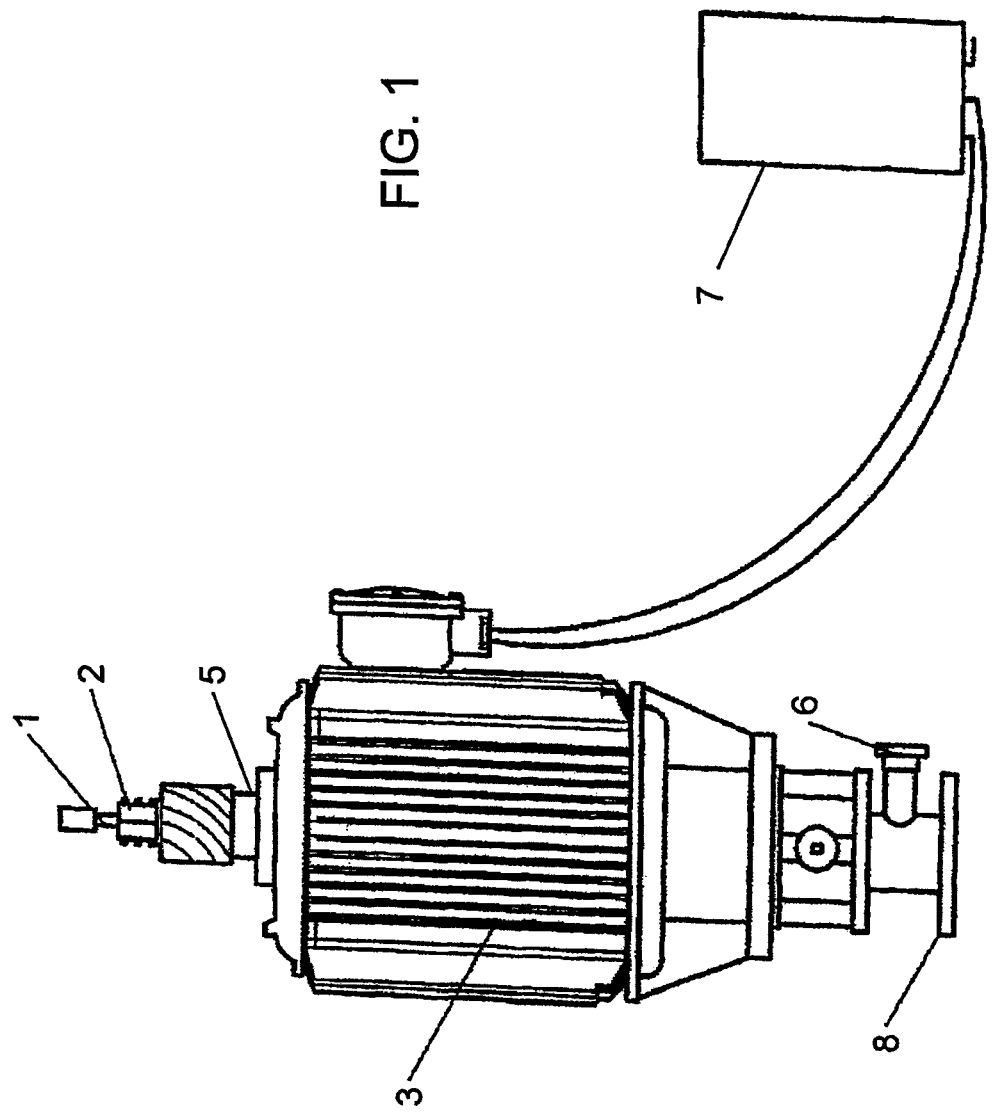
FIG. 1 is an installation diagram of a rod ground screw pump direct drive device, in which the following elements are present.
Figure 2:
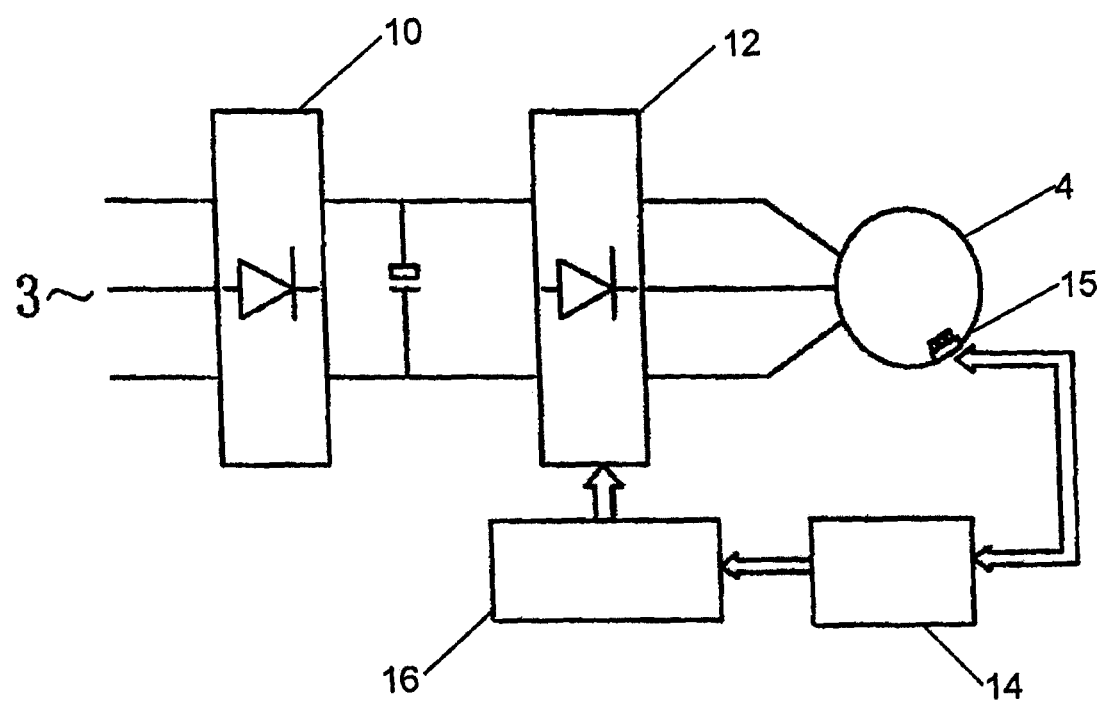
Figure 3:
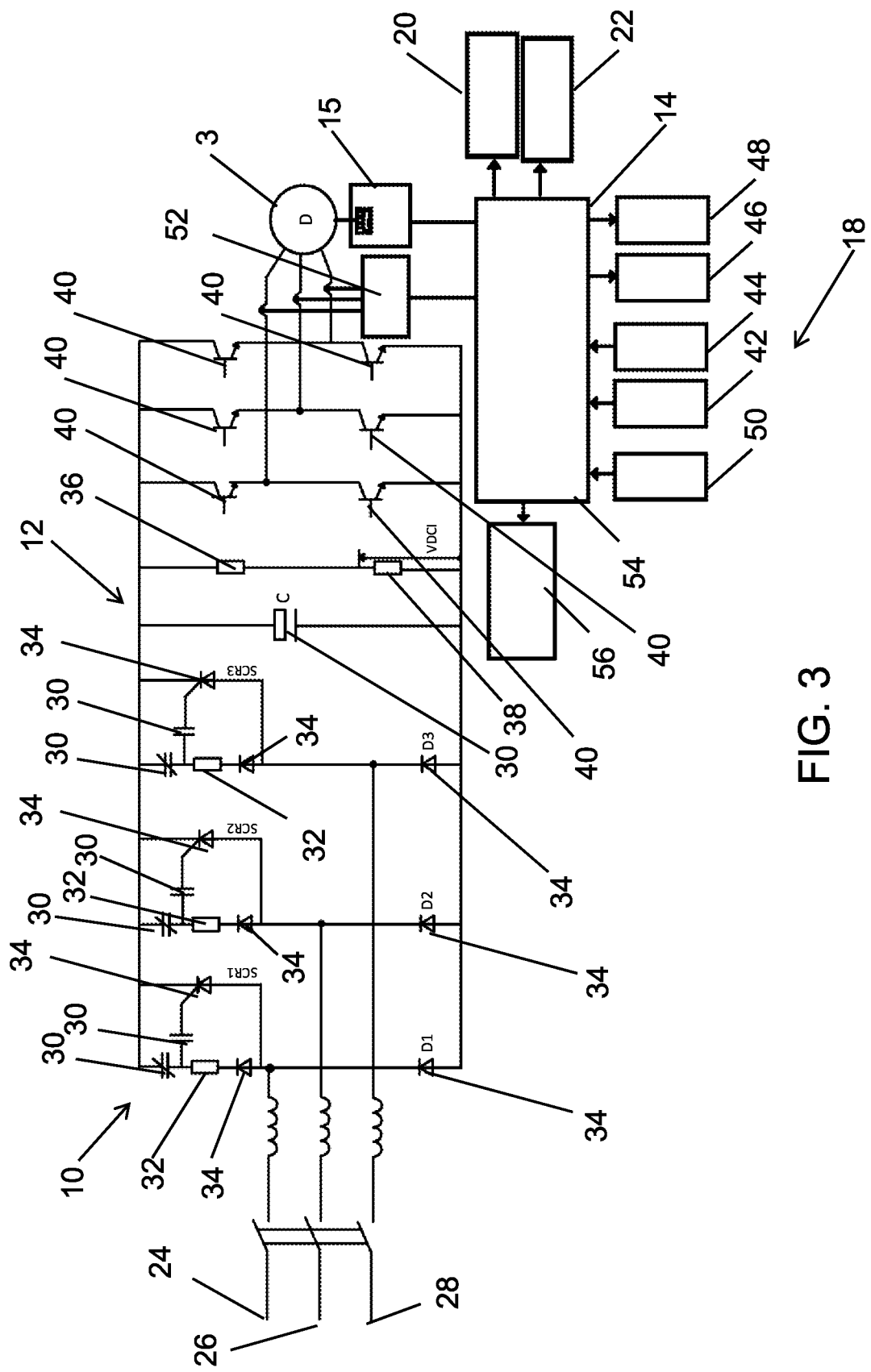

polished rod 1, polished clip 2, permanent magnet explosion proof brushless direct current motor 4, oil well flange 8, flange oil outlet 6, motor controller 7;

FIG. 2 is a block diagram of a controller circuit;

FIG. 3 is a schematic diagram of a controller.

DETAILED DESCRIPTION OF THE INVENTION

Embodiment 1

The motor direct drive rod ground screw pump device comprises a polished rod 1, polished rod clip 2, motor 4, motor controller 7, flange oil outlet 6, oil well flange 8, screw pump body 9, said motor is a vertical three phase permanent magnet brushless direct current motor with a hollow shaft, the polished rod passes through said hollow shaft; the motor was fixed with the hollow shaft as one through polished rod clip and connects to the pump shaft the screw pump downhole; said motor controller comprises a rectification circuit for rectifying the alternating current into direct current; converter circuit for transforming the direct current into adjustable alternating current; CPU for modulating the motor sensorless DSP direct current brushless sine wave; driving circuit for isolating the signal and magnifying the power, as well as acting on commutation circuit and adjusting the voltage of permanent magnet motor thus realizing poleless speed adjusting.

Embodiment 2

The motor direct drive rod ground screw pump device comprises a polished rod 1, polished rod clip 2, motor 4, motor controller 7, flange oil outlet 6, oil well flange 8, screw pump body 9, said motor is a vertical three phase permanent magnet brushless direct current motor with a hollow shaft, the polished rod passes through said hollow shaft; the motor was fixed with the hollow shaft as one through polished rod clip and connects to the pump shaft the screw pump downhole; said motor controller comprises a rectification circuit for rectifying the alternating current into direct current; converter circuit for transforming the direct current into adjustable alternating current; Hall sensor for detecting the rotary position of the rotor of vertical three phase permanent magnet brushless direct current motor; CPU for modulating the direct current brushless sine wave of mono-chip microcomputer with Hall sensor; driving circuit for isolating the signal and magnifying the power, as well as acting on commutation circuit and realizing smoothly speed adjusting of motor.

Embodiment 3

The motor direct drive rod ground screw pump device has the same structure as that of embodiment 1 with the exception that the rectification circuit is a three phase semi-control bridge, no charging limiting current contactor.

Embodiment 4

The motor direct drive rod ground screw pump device has the same structure as that of embodiment 2 with the exception that the commutation circuit is a three phase full-bridge commutation output employing insulate gate bipolar transistor IGBT.

Embodiment 5

The motor direct drive rod ground screw pump device has the same structure as that of embodiment 1 or 2 with the exception that the rectification circuit is a three phase semi-control bridge, no charging limiting current contactor. The commutation circuit is a three phase full-bridge commutation output employing insulate gate bipolar transistor IGBT. CPU has an inputs of controller direct current bus voltage, motor current and temperature signal of module radiator, and controller has a de-moisture space heat output.

Embodiment 6

The motor direct drive rod ground screw pump device has the same structure as that of embodiment 5 with the exception that the vertical three phase permanent magnet brushless direct current motor is installed with a thrust bearing with a dynamic load of 20 tons.

Embodiment 7

The motor direct drive rod ground screw pump device has the same structure as that of embodiment 5 with the exception that the vertical three phase permanent magnet brushless direct current motor is installed with a thrust bearing with a dynamic load of 30 tons.

Embodiment 8

The motor direct drive rod ground screw pump device has the same structure as that of embodiment 5 with the exception that the vertical three phase permanent magnet brushless direct current motor employs F level insulation, the security level of the shell is IP54 and the temperature rises on B-class assessment.yu Embodiment 9

The motor direct drive rod ground screw pump device has the same structure as that of embodiment 5 with the exception that the motor torque of the vertical three phase permanent magnet brushless direct current motor system is 200-6000 Nm, rotary speed is 0-1000 rpm/min.

Embodiment 10

The motor direct drive rod ground screw pump device has the same structure as that of embodiment 5 with the exception that the current sampling signal between commutation circuit and motor is transferred into CPU.

Embodiment 11

The motor direct drive rod ground screw pump device has the same structure as that of embodiment 5 with the exception that the range of the input for the controller power supply is 3.times.380V-3.times.690V, f=50/60 Hz.

Embodiment 12

The motor direct drive rod ground screw pump device has the same structure as that of embodiment 5 with the exception that the CPU has a communication interface and a human-machine operation panel.

Embodiment 13

The motor direct drive rod ground screw pump device has the same structure as that of embodiment 5 with the exception that the CPU has a start-stop signal input port.

What is claimed is:

1. A direct drive motor for driving a polished rod connected to a screw pump in a well, the direct drive motor comprising:
   a permanent magnet motor coaxially positioned above a well head;
   the permanent magnet motor comprising a stator and a rotor, the stator driving the rotor, the rotor comprising a hollow shaft that is sized to receive the polished rod;
   the polished rod extending down into said well and coupled to said screw pump; and
   a rotational clamp for clamping the polished rod above said permanent magnet motor and supporting the polished rod within the hollow shaft such that the polished rod rotates with the rotor.

2. The direct drive motor of claim 1, further comprising a motor controller.

3. The direct drive motor of claim 2, wherein the motor controller comprises a rectification circuit for rectifying a three phase alternating current into direct current.

4. The direct drive motor of claim 3, wherein the motor controller comprises a converter circuit for converting the direct current into alternating current which can be adjusted.

5. The direct drive motor of claim 4, wherein the motor controller comprises one or more sensors for speed measurement and feedback.

6. The direct drive motor of claim 2, wherein the motor controller comprises open loop control.

7. The direct drive motor of claim 5, wherein the motor controller comprises closed loop control.

8. The direct drive motor of claim 4, wherein the motor controller comprises a Hall position sensor for detecting the rotary position of the rotor of the permanent magnet motor.

9. The direct drive motor of claim 8, wherein the motor controller comprises a CPU for modulating the direct current brushless sine wave of a mono-chip microcomputer with the Hall sensor.

10. The direct drive motor of claim 4, wherein the motor controller comprises a driving circuit for isolating the signal and magnifying the power, as well as acting on the converter circuit and adjusting the voltage and frequency of the permanent magnet motor to provide continuous speed adjustment.

11. The direct drive motor of claim 9, wherein the rectification circuit is a three phase semi-control bridge, the converter circuit is a three phase full-bridge converter output employing an insulated gate bipolar transistor, and the CPU has inputs of controller direct current bus voltage, motor current and temperature signal of a module radiator.

12. The direct drive motor of claim 4, wherein the voltage of the three phase alternating current supplied to the motor controller is between 3×380V and 3×690V at a frequency of between 50 and 60 Hz.

13. The direct drive motor of claim 9, wherein a current sampling signal between the converter circuit and the motor is transferred into the CPU.

14. The direct drive motor of claim 9, wherein the CPU has a communication interface and a human-machine operation panel.

15. The direct drive motor of claim 9, wherein the CPU has a start-stop signal input port.

16. The direct drive motor of claim 1, wherein the permanent magnet motor is a vertical three phase permanent magnet brushless direct current motor.

* * * * *